S. W. & C. V. TICHENOR.
VEHICLE RUNNING GEAR.
APPLICATION FILED APR. 25, 1912.
1,089,988.
Patented Mar. 10, 1914.
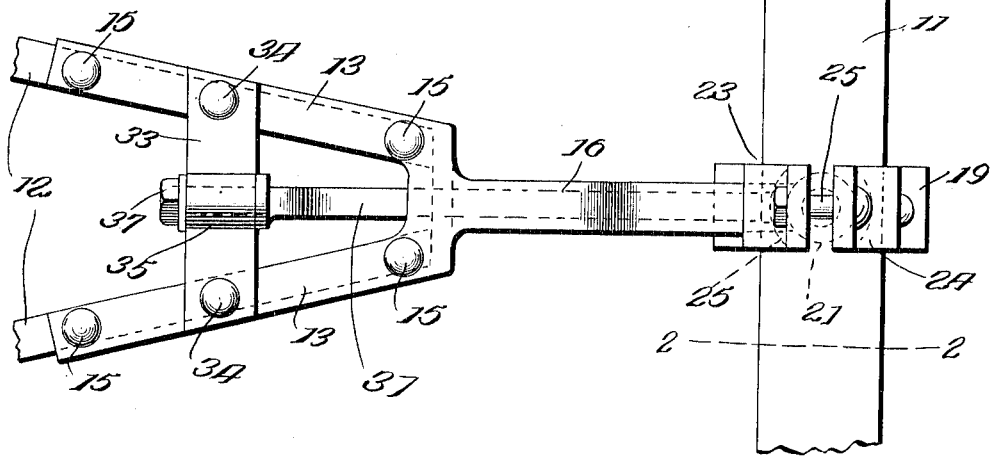
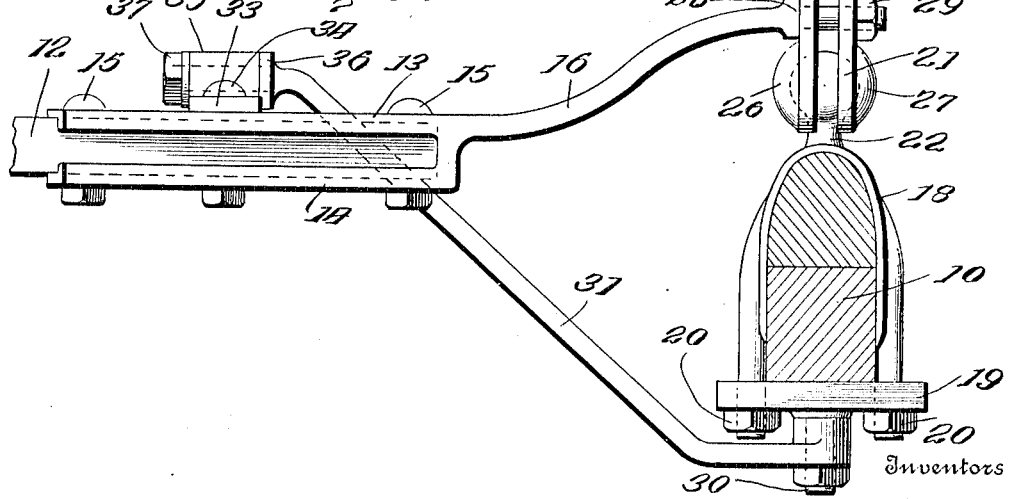

UNITED STATES PATENT OFFICE.

SQUIRE W. TICHENOR AND CLYDE V. TICHENOR, OF MATANZAS, KENTUCKY.

VEHICLE RUNNING-GEAR.

1,089,988. Specification of Letters Patent. Patented Mar. 10, 1914.

Application filed April 25, 1912. Serial No. 693,020.

*To all whom it may concern:*

Be it known that we, SQUIRE W. TICHENOR and CLYDE V. TICHENOR, citizens of the United States, residing at Matanzas, in the county of Ohio and State of Kentucky, have invented certain new and useful Improvements in Vehicle Running-Gear, of which the following is a specification.

This invention relates to improvements in vehicles, more particularly to the couplings between the forward axle, the reach structure and the spring, and has for one of its objects to provide a simply constructed flexible coupling between these parts which is strong and durable, and yieldable to the various motions between the parts.

With these and other objects in view, the invention consists in certain novel features of construction as hereafter shown and described, and then specifically pointed out in the claims, and in the drawings illustrative of the preferred embodiment of the invention: Figure 1 is a plan view of a portion of a forward axle, a portion of the reach mechanism, and a portion of the forward spring, with the improvement applied; Fig. 2 is a side elevation with the axle and spring in section on the line 2—2 of Fig. 1.

Corresponding and like parts are referred to in the following description and indicated in all the views of the accompanying drawings by the same reference characters.

The improved device may be applied without material structural changes to axles, springs and reaches of various forms and construction, and it is not desired therefore, to limit the improved invention to any specific form of these parts, but for the purpose of illustration a portion of a conventional axle is represented at 10, a plurality of leaves of the forward spring at 11, and a portion of a conventional reach at 12, the latter being formed in two parts converging toward the axle as shown in Fig. 1. The reach members 12 are coupled by V-shaped clamp plates 13—14 which are bolted or otherwise secured as shown at 15 to the reach members. At their forward ends the plates 13—14 are united and extended into a single arm or rod 16. Attached to the axle 10 is a clip device comprising a housing or upper portion 18, clamp plate 19 and clamp nuts 20. Extending from the upper face of the housing 18, is a spherical or globular lug 21 which is connected to the housing 18 by a contracted stock or neck 22. The spring members 11 are partly embraced intermediate their ends by clamp plates 23—24 which are directed inwardly and upwardly above the springs and inwardly and downwardly beneath the springs. The clamp plates are united by a clamp bolt 25 above the spring members while the downwardly directed portions terminate in semi-spherical or globular sockets 26—27 which engage around the globular lug 21.

The arm 16 is provided with a lateral shoulder 28 which bears firmly against the member 23 below the springs and is provided with a stud 29 which extends through the plates 23—24 between the globular stud 26 and the springs and is provided with a clamp nut bearing against the plate 24. By this means the member 16 is firmly and immovably coupled to the clamp plates.

Depending from the clamp plate 19 is a stud 30 to which a brace member 31 is swingingly coupled and held in position by a clamp nut. Extending over the clamp plates 13 is a combined stay and brace support 33 which is bolted or otherwise secured at 34 to the clamp plates and the reach. Rising from the member 33 intermediate the ends, is a lug 35 through which the opposite end of the brace 31 extends, and is provided with a stop collar 36 and a clamp nut 37 bearing against opposite ends of the lug. By this means the brace 31 is swingingly coupled at the ends respectively to the axle and to the reach, and permits a certain degree of flexibility to the connection, while at the same time holding the axle and reach firmly united and coacting with the arm 16 and the flexible coupling between the spring and the axle. By this means the forward axle is free to move in all directions when in use, while at the same time being firmly supported and movable without twisting the vehicle or imparting jarring motion thereto.

The improved device dispenses with the cumbersome and expensive "fifth wheel" structure of a vehicle, and accomplishes all of the desirable results attained by the ordinary fifth wheel in a much simpler and less expensive manner, and likewise with a device which is stronger and more durable and of greater flexibility than the ordinary fifth wheel coupling.

Having thus described the invention, what is claimed as new is:

1. A vehicle running gear comprising an axle, a clip supported on the axle and provided with a spherical extension, a reach, a brace supported by the reach, said brace being formed with a curved arm, a spring arranged above and extending parallel with the axle, a plurality of brackets embracing said spring and receiving the terminal of said arm, said arm connecting the brackets below the spring, the brackets being formed with sockets which receive the spherical extension of the axle clip, and a brace one terminal of which is rotatably supported on the axle and the other terminal of which is received within a bearing carried by the reach.

2. A vehicle running gear comprising an axle, a clip supported on the axle, a brace supported by the reach, a spring arranged above and extending parallel with the axle, a bracket embracing the spring and having a connection with the clip which is mounted on the axle whereby the same may move with respect to each other, said brace being connected to said bracket, and a second brace, one terminal of which is mounted in a bearing supported by the reach, said brace extending through and beneath the reach, its terminal remote from the reach being rotatably connected to the clip which is mounted on the axle.

In testimony whereof we affix our signatures in presence of two witnesses.

SQUIRE W. TICHENOR. [L. s.]
CLYDE V. TICHENOR. [L. s.]

Witnesses:
LEE MASON,
ALUCIE ROWE.

Copies of this patent may be obtained for five cents each, by addressing the "Commissioner of Patents, Washington, D. C."